June 20, 1933. E. H. LANGE 1,915,099
AUTOMATIC POWER CONTROL MECHANISM FOR AUTOMOBILES
Filed June 29, 1932
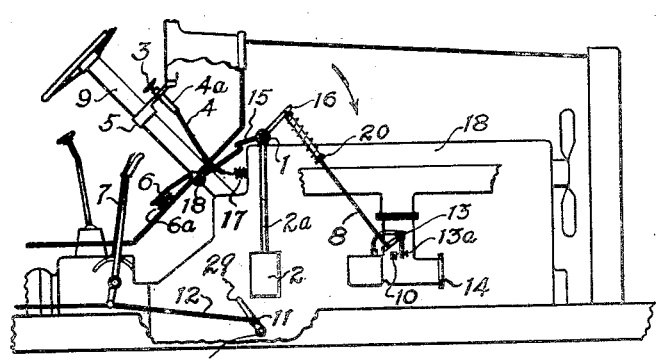
WITNESSES:
B. A. Grune
E. C. Shagle
INVENTOR.
Edward H. Lange Patented June 20, 1933

1,915,099

UNITED STATES PATENT OFFICE

EDWARD H. LANGE, OF BALTIMORE, MARYLAND

AUTOMATIC POWER-CONTROL MECHANISM FOR AUTOMOBILES

Application filed June 29, 1932. Serial No. 620,008.

This invention relates to a mechanism by means of which the power of the automobile engine is automatically controlled during the starting operation, and while riding, and by means of which the power can be selectively increased in the usual manner, also by means of which the maximum value of power under automatic control can be readily set to a desirable value while driving.

The principal object of this invention is to provide a device which is simple, reliable, and readily adaptable to present types of automobile by means of which the power upon up-grade is automatically increased and the power upon down-grade automatically reduced, in each instance with reference to the power upon a level plane which is readily adjustable by the driver while riding, and to provide a device by means of which the driver may use either the common form of continuous foot-control of power while starting and riding, or the automatic control which completely eliminates the necessity of attention during starting or riding to the separate foot-control of power.

A further object of this invention is to provide a simple mechanism separately adjustable to the brake control member and the clutch control member such that the power is reduced to the idle power by the brake control member before actual braking takes place, and such that the increase of power as the clutch engages gives smooth starting, also to provide simple means to relieve excessive strain upon the carburetor stop when the brake or clutch control members are completely deflected, and to permit a large unbalancing of the balance mechanism beyond the limit fixed by the carburetor stop.

Another object of this invention is to combine with the gravity balanced mechanism used for power control a simple mechanism for changing the balance, so that the power under automatic control can be set at a convenient location for the driver, as for example the steering post or instrument panel, and further to provide means for changing the balance selectively to increase the power without substantial friction upon the gravity balanced mechanism.

These and other objects are hereinafter set forth, and more particularly pointed out in the appended claims, reference being made to the accompanying drawing.

In the drawing, Fig. 1 shows a side view of the gravity balanced mechanism, carburetor and controls with the carburetor mounted upon the right-hand side of the automobile, Fig. 2 shows a top view of the gravity balanced mechanism, Fig. 3 shows a link for connection between the throttle and the gravity balanced mechanism, Fig. 4 shows a side view from the left hand side, of the clutch pedal, a portion of the gravity balanced mechanism, and maximum power adjustment, a brake pedal being understood to be adjacent the clutch pedal, in a location commonly used. Figures 5 and 6 show an application of this invention to an automobile in which the carburetor is mounted upon the left-hand side, at the top of the engine. Fig. 5 shows a side view from the left-hand side, and Fig. 6 shows an end view from the front of the automobile of the throttle and a link connecting the throttle and the gravity balanced mechanism.

Referring to Fig. 1, the balance weight 2 attached to the rod 2a is securely fastened to the cross-shaft 1, as for example by a set-screw. The cross-shaft 1 is supported in bearings which are fastened to the engine top 18. The arm 16 is fixed to the rod 2a, the balance weight 2, rod 2a and arm 16 forming a pendulum. Connecting the arm 16 and the throttle shaft 13 of the carburetor 14, is the link 8. The direction of motion of the arm 16 which opens the throttle is shown by the arrow. At 10 is a stop for limiting the closure of the throttle, and the screw 13a is for adjusting the amount of idle power when the throttle is closed. At 20 is an adjusting screw for adjusting the normal minimum operating power for a level plane. At 6 is a foot-lever, and at 6a a spring for returning the foot-lever to its normal position. The lever 6 is pivoted at 18, and an extension of the lever is arranged to be in close proximity to the arm 15, which is securely fixed to the cross-shaft 1. At 7 is the emergency brake control, and at 29 a lever pivoted to the chassis or engine at 11a. The link 12 connects the emergency brake control 7 and the lever 29, and is pinned at 11. The lever 29 is so arranged that complete release of the emergency brake at 7 moves the lever 29 down, and permits the balance weight 2 to move backward. When the control 7 is pulled backward, the lever 29 moves forward, engages the balance weight 2, and closes the throttle. At 9 is the steering-post, at 5 a brace between the steering post and dash-board, and at 3 a control button.

Referring to Fig. 2, the engine top is shown at 18, and at 19 and 19a are bearings securely fastened to the engine top by the bolts 18a and 18b. The cross-shaft 1 is free to turn in the bearings 19 and 19a, and at one end of the cross-shaft is the pendulum, and at the other end the arms 21, 21a and 22. Each of these arms is adjustably and securely fastened to the cross-shaft by set-screws. The arm 21 is arranged to be engaged by the brake control member, and the arm 21a by the clutch control member.

Referring to Fig. 3, the rod 8 is threaded at the end 8a, and the end 8b is arranged to form a pin joint for connection with the throttle. At 8d a separate rod is arranged to form a pin joint for connection with the arm 16, Fig. 1 or Fig. 2. Threaded upon the end 8a of the rod 8 is the knurled nut 20 which serves as a shoulder for one end of the tube 20a. The rods 8 and 8d are held together by the spring 8c fastened to these rods. The total length of the link between 8b and 8d can be adjusted by means of the nut 20. The length of the link is fixed for forces of compression in opening the throttle, and when the throttle is closed to the limit fixed by the stop 10, the link is free to extend without placing excessive strain upon the mechanism, for example as the throttle is forced to a closed position by the brake control member or the clutch control member.

Referring to Fig. 4, at 23 are the floor boards, and at 24 is the clutch control member. The brake control member is not evident in Fig. 4, but it is understood to be in an adjacent position, in a manner commonly used. The cross-shaft is shown at 1, and the bearing at 19. The arm 21a can be adjusted to the proper position and secured by the set screw 21b. By means of this adjustment the angular position of the arm 21a can be arranged with reference to the clutch control member so as to prevent excessive power as the clutch is engaging. In similar manner the arm 21 (Fig. 2) is arranged with reference to the brake control member. The arm 21 is adjustable upon the cross-shaft 1, and the angular position of the arm can be adjusted so that the normal lost motion present at the brake control member gives sufficient range to reduce the power by a small force upon the brake control member, without actual application of the brakes. At 22 is a control-arm adjustably fastened to the cross-shaft 1 by a set-screw, and at 4 is a cable through which the control-rod 3a passes. The control rod 3a terminates at the control-button 3 (Fig. 1), and is constrained by friction within the cable and by the cable terminal member 4a from sliding, except under the control of the operator. The lower end of the control-rod 3a is connected to the control-arm 22 by the spring 17.

Fig. 5 shows another form of arrangement when the carburetor 14 is located on the left-hand side of the automobile. The rod 2a is supported by the bearing 19b. The rod 2a contains the hole 1a through which a bolt passes, the bolt serving as a shaft upon which the rod 2a turns freely. At 26 is a link fastened to 2a by means of a screw and knurled nut 25. The throttle shaft 13 in this instance turns about an axis at right angles to the axis of the pendulum. At 2c is an arm attached to the rod 2a, and adjustably attached to 2c at 2d are two arms for engaging the clutch control member and the brake control member, one of the arms being shown at 21c. Connecting the control rod 3a and the arm 2c is the spring 17. The extension of the foot-lever 6b is arranged to be free from the arm 21c normally, so that the pendulum can be deflected to open the throttle when desired; the extension of the foot-lever 6b is arranged to limit the forward motion of the pendulum when the automobile is brought to rest rapidly. Fig. 6 shows certain details of the link 26 omitted in Fig. 5 for simplicity of illustration. The throttle shaft 13 is assumed to be provided with a stop and idling adjustment at the opposite extremity of the shaft, in a manner commonly used, as for example in Fig. 1. The direction of opening of the throttle is shown by the arrow. The arm 13b is fixed to the throttle shaft, and engaging the arm 13b is the link 26. The spiral spring 27 is securely fastened at one end by the screw and knurled nut 25. The other end of the spiral spring is in contact with the lower side of the arm 13b. By means of the nut 25 the throttle may be adjusted to a position in advance of the idling position. At 1b is a bolt which passes through the hole 1a and supports the member 2a.

By means of this invention, in starting the automobile the clutch control member permits an increase of power as the clutch is allowed to engage, and after engagement of the clutch the forward acceleration continues to provide a temporary excess of power for starting due to the backward swing of the pendulum. After uniform motion of the automobile is established, the power is determined by the adjustment 20 for a particular grade, the spring 17 being completely relaxed and under no tension. By means of a small tension upon the control-button, the amount of power under automatic control can be readily increased.

Important features of this invention are the simple means for securing sensitivity and quick response to changes required in the gravity balance mechanism upon release of the brake or clutch control members, for minimizing the free motion of the gravity balance mechanism especially undesirable for small throttle openings, and for controlling the opening of the throttle.

While I have shown and described this invention as applied to different arrangements of parts, it will be obvious that other changes may be made in the construction and arrangement of parts, without departing from the spirit of my invention, and I do not therefore limit myself to the form or arrangement shown.

What is claimed is:

1. In an automobile, the automatic power control system having a throttle, a stop limiting the closure of said throttle, a gravity balanced mechanism operatively and adjustably connected with said throttle, having means for advancing or retarding the throttle relative to the balance position of said gravity balanced mechanism, and for displacement beyond the position of closure of said throttle limited by said stop, a brake control member, means operatively connected with said gravity balanced mechanism normally disconnected from and operable by said brake control member for closing said throttle, a clutch control member, means operatively connected with said gravity balanced mechanism normally disconnected from and operable by said clutch control member for closing the throttle, means normally disconnected from said gravity balanced mechanism for selectively opening the throttle, a control rod, and a spring operatively linking said gravity balanced mechanism and said control rod for setting the throttle opening.

2. In an automobile, in combination, a throttle, a stop limiting the closure of said throttle, a vertically stabilized mechanism, an adjustable connection between said throttle and said vertically stabilized mechanism, said connection being rigid during opening of said throttle and flexible upon closure of said throttle at said stop, means normally disconnected from said vertically stabilized mechanism for selectively closing the throttle, means normally disconnected from said vertically stabilized mechanism for selectively increasing the throttle opening, a control rod, and flexible means operatively interlinking said vertically stabilized mechanism and said control rod for setting the throttle opening in excess of the opening normally provided by said vertically stabilized mechanism.

3. In an automobile, in combination, a throttle, a stop limiting the closure of said throttle, a gravity stabilized balance mechanism responsive to changes in grade, an adjustable connection between said throttle and said gravity stabilized balance mechanism, said adjustable connection having means for advancing or retarding the throttle relative to the balance position of said gravity stabilized balance mechanism, and being rigid upon opening said throttle and extensible upon closure of said throttle at said stop, an arm operatively connected with said gravity stabilized balance mechanism, a control-button, spring means interlinking said control-button and said arm, a brake control member, a clutch control member, means operable by and normally disconnected from said brake control member for closing said throttle, means operable by and normally disconnected from said clutch control member for closing said throttle, and means normally disconnected from said gravity stabilized balance mechanism for selectively increasing the throttle opening.

4. In an automobile, in combination, a throttle, a stop limiting the closure of said throttle, a gravity balanced mechanism responsive to changes in grade, a link connecting said throttle and said gravity balanced mechanism, said link having means for adjusting the throttle relative to balance position of said gravity balanced mechanism and providing a positive connection for opening said throttle and a yielding connection upon closure of said throttle at said stop, means normally disconnected from said gravity balanced mechanism for selectively closing the throttle, means normally disconnected from said gravity balanced mechanism for selectively increasing the throttle opening, a control rod, and spring means interlinking said contact rod and gravity balanced mechanism for setting the throttle opening in excess of the opening normally provided by said gravity balanced mechanism, and for steadying the balance of said mechanism.

5. In an automobile, in combination, a throttle, a stop limiting the closure of said throttle, a brake control member, a clutch control member, a pendulum mechanism normally disconnected from and controllable by either of said members, a link operatively connecting said pendulum mechanism and throttle, having means for positively opening said throttle, and permitting further angular displacement of said pendulum mechanism by either of said members upon closure of the throttle at said stop, means normally disconnected from the pendulum mechanism for selectively opening the throttle, a control-button, a flexible cable, a terminal member for said cable, a control-rod within said flexible cable connected at one of its ends to said control-button, and spring means operatively interconnecting the other end of said control-rod and said pendulum mechanism, for setting the throttle opening in excess of the opening normally provided by the pendulum mechanism.

6. In an automobile, an automatic power control mechanism having a throttle, a stop limiting the closure of said throttle, a gravity balanced mechanism responsive to changes in grade, a linkage mechanism operatively interconnecting said throttle and said gravity balanced mechanism, said linkage mechanism having screw means for adjusting said throttle relative to the balance position of said gravity balanced mechanism, being rigid upon opening said throttle and extensible upon closure of said throttle to a position limited by said stop, an adjustable arm operatively connected with said gravity balanced mechanism, a brake control member capable of engaging and normally disconnected from said arm for closing the throttle, a second adjustable arm operatively connected with said gravity balanced mechanism, a clutch control member capable of engaging and normally disconnected from said second arm for closing the throttle, and means normally disconnected from said gravity balanced mechanism and throttle for selectively increasing the throttle opening.

7. In an automobile, in combination, the automatic power control mechanism of claim 6, a control-button, a flexible cable, a terminal member for supporting said cable, a control-rod frictionally constrained within said cable and terminal member and connected at one end to said control-button, and flexible means operatively connecting the other end of said control-rod and said gravity balanced mechanism for setting the throttle opening in excess of the opening normally set by the gravity balanced mechanism for a particular grade.

8. In an automobile, an automatic power control system comprising a throttle, a pendulum mechanism for controlling the opening of the throttle, a brake control member, a clutch control member, means for controlling the pendulum mechanism by either of said members, a control-button, a flexible cable, a terminal member for supporting said flexible cable, a control-rod frictionally constrained within said flexible cable and connected at one end to said control-button, and flexible means operatively interconnecting said pendulum mechanism and the other end of said control-rod by means of which the power can be set to a desired excess above the power provided by said pendulum mechanism at any grade.

9. In an automobile, in combination, a throttle, a stop limiting the closure of said throttle, a brake control member, a clutch control member, a pendulum mechanism operatively connected to the throttle, said mechanism being normally disconnected from and controllable by either of said members, and having means for positively opening said throttle permitting angular displacement of said mechanism by constraint of either of said members beyond the position of closure of said throttle limited by said stop, a control rod, and flexible means operatively linking said pendulum mechanism and said control rod for setting an angular displacement of said pendulum mechanism and for steadying the position of said pendulum mechanism.

10. In an automobile having a throttle, a brake control member, a clutch control member, and a pendulum mechanism controllable by either of said members and controlling said throttle, a control rod and spring means operatively linking said control rod and pendulum mechanism for setting the throttle opening in excess of the opening normally provided by the pendulum mechanism, and for steadying the position of the pendulum mechanism.

11. In an automobile having a throttle, a brake control member, a clutch control member, a gravity balanced mechanism, and means for controlling said gravity balanced mechanism by either of said members, a link connection for operatively connecting said gravity balanced mechanism and said throttle, said link connection being rigid for opening said throttle and yieldable upon closure of said throttle, a control rod, and spring means operatively interlinking said gravity balanced mechanism and said control rod, for steadying the balance of said mechanism and for setting the throttle opening in excess of the opening normally provided by said mechanism.

12. In an automobile having a throttle, a brake control member, a clutch control member, and a gravity balanced mechanism controllable by either of said members and controlling said throttle, a control rod and spring means operatively interlinking said control rod and gravity balanced mechanism for setting the throttle opening in excess of the opening normally provided by said mechanism, and for steadying the balance of said mechanism.

13. In an automobile, in combination, an internal combustion engine, an engine-motive fluid controller for said engine, a clutch control member, a brake control member, an inertia-motive mechanism, an operative connection between said mechanism and said engine-motive fluid controller having yieldable means, means for selectively and positively limiting the flow of engine-motive fluid operable by the clutch control member, means for selectively and positively limiting the flow of engine-motive fluid operable by the brake control member, a control rod, and spring means interlinking the inertia-motive mechanism and control rod, for decreasing the restraint upon the inertia-motive mechanism upon up-grade and increasing the restraint upon down-grade, for selectively setting the flow of engine-motive fluid, and for steadying the inertia-motive mechanism.

14. In an automobile, in combination, a clutch control member, a throttle for controlling a flow of fluid, a pendulum operatively connected with the throttle, controlling said throttle in response to the acceleration and the forward or rearward inclination of the automobile to a level plane, means controllable by the clutch control member for positively limiting the throttle opening to a selective amount, a control rod, and spring means operatively linking the pendulum and control rod, for selectively displacing the pendulum in excess of its normal displacement at any grade, and for insuring quick response of the throttle upon release of the clutch control member.

15. In an automobile, in combination, a clutch control member, a brake control member, a throttle for controlling a flow of fluid, a pendulum operatively connected with the throttle for controlling the throttle in response to the acceleration and the forward and rearward inclination of the automobile to a level plane, means controllable by the clutch control member for positively limiting a selective amount of throttle opening, means controllable by the brake control member for positively limiting a selective amount of throttle opening, a control rod, and spring means operatively linking the control rod and pendulum, for displacing the pendulum in excess of its normal displacement at any grade, for assisting the further opening of the throttle upon up-grade, and for retarding the closure of the throttle upon down-grade.

16. In an automobile, in combination, a clutch control member, a throttle for controlling a flow of fluid, a pendulum operatively connected with the throttle for controlling the throttle in response to the acceleration and the forward and rearward inclination of the automobile to a level plane, means for positively controlling the rearward displacement of said pendulum in relation to the displacement of said clutch control member, a control rod, and spring means operatively linking the control rod and pendulum, for selectively displacing the pendulum rearwardly in excess of its normal displacement for any grade.

17. In an automobile, in combination, a brake control member, a throttle for controlling a flow of fluid, a pendulum operatively connected with the throttle for controlling the throttle in response to the acceleration and the forward and rearward inclination of the automobile to a level plane, means for positively controlling the forward displacement of the pendulum in relation to the dispaicement of said brake control member, a control rod, and spring means operatively linking the pendulum and control rod, for selectively displacing the pendulum rearwardly in excess of its normal displacement for any grade.

18. In an automobile, in combination with a throttle for controlling a flow of fluid, a gravity balanced inertia-motive mechanism operatively connected with said throttle for controlling the throttle in response to the forward and rearward acceleration and inclination of the automobile to a level plane, a control member, means for controlling the displacement of said gravity balanced inertia-motive mechanism by said control member, and in positive displacement relation with said control member, a control rod, and spring means operatively linking the gravity balanced inertia-motive mechanism and control rod.

19. In an automobile, in combination, a throttle for controlling a flow of fluid, a control member, a pendulum operatively connected with the throttle, operable by and normally disconnected from said control member, a clutch operatively connected with said control member, a control rod, and spring means operatively linking the control rod and said pendulum.

20. In an automobile, in combination, a throttle for controlling a flow of fluid, a control member, a pendulum operatively connected with the throttle, displaceable by and normally disconnected from said control member, a brake operatively connected with said control member, a cable, a control rod in said cable, and spring means operatively linking said control rod and the pendulum.

21. In an automobile, in combination, a throttle for controlling a flow of fluid, a first control member, a second control member, a pendulum operatively connected with said throttle, displaceable by and normally disconnected from each of said control members, a clutch operatively connected with the first control member, a brake operatively connected with the second control member, a cable, a support for said cable, a control rod in said cable, and spring means operatively linking the control rod and the pendulum.

In witness whereof I have hereunto set my hand this 29th day of June, 1932.

EDWARD H. LANGE.